United States Patent [19]

Navalon-Chicote

[11] Patent Number: 5,724,918
[45] Date of Patent: Mar. 10, 1998

[54] AUTOMATIC WASHING AND DRYING MACHINE FOR ANIMALS

[75] Inventor: Vicente Navalon-Chicote, Cambrils, Spain

[73] Assignee: Leadercan, S.L., Cambrils, Spain

[21] Appl. No.: 810,526

[22] Filed: Mar. 3, 1997

[51] Int. Cl.[6] ................................................. A01K 13/00
[52] U.S. Cl. ......................................................... 119/668
[58] Field of Search ............................ 119/665, 668

[56] References Cited

U.S. PATENT DOCUMENTS

| | | |
|---|---|---|
| 3,884,191 | 5/1975 | Stout . |
| 4,057,032 | 11/1977 | Dimitriadis . |
| 4,183,323 | 1/1980 | Maines ........................ 119/668 |
| 4,505,229 | 3/1985 | Altissimo ..................... 119/668 |
| 4,549,502 | 10/1985 | Namdari ...................... 119/158 |
| 4,782,792 | 11/1988 | Anthony et al. . |
| 5,009,197 | 4/1991 | Cottell ........................ 119/159 |
| 5,435,269 | 7/1995 | Chen ....................... 119/668 X |
| 5,513,598 | 5/1996 | Zapparoli .................... 119/756 |

FOREIGN PATENT DOCUMENTS

| | | |
|---|---|---|
| 0 673 599A1 | 9/1995 | European Pat. Off. . |
| 2 543 795 | 10/1984 | France . |

Primary Examiner—Thomas Price
Attorney, Agent, or Firm—McGlew & Tuttle

[57] ABSTRACT

A machine for the washing and drying of animals, which has a large housing with a principal washing compartment or cabin, which can be divided into two or more sections for washing respective animals at the same time completely untied. A second compartment has a heated air ventilator for the cabin. This air is recirculated again to the air ventilator through a double ceiling of the cabin. A third compartment, accommodates a hose with a nozzle for spraying water from the water supply to wash the paws of the animal before it enters the cabin. A fourth compartment accommodates various bottles of respective treatment liquids, such as cleaning, softening, antiseptic and the like liquids with devices for selecting same, such as pumps with pulsating function, with there being provided a hydraulic circuit for the water and treatment liquids. The hydraulic circuit has a first tank only for the fresh water, with da fluid heater for heating same, and a second tank for the water and liquids to be recirculated. The elements that comprise the hydraulic circuit, the air ventilator, and the air and water heater being controlled by a computer installed in the same machine.

11 Claims, 2 Drawing Sheets

AUTOMATIC WASHING AND DRYING MACHINE FOR ANIMALS

FIELD OF THE INVENTION

The present invention pertains to an automatic machine for the washing and drying of animals, such as dogs and similar animals, of the type which basically comprises a cabin having an access door for the animal and being provided on the inside with a series of water and other cleaning and antiseptic liquid spray nozzles, as well as means for drying same.

BACKGROUND OF THE INVENTION

Machines of this type have already been known for a long time. In fact, applicant filed European Patent Application No. 0673599, which pertains to a machine, which comprises a cabin provided with entrance and exit doors for the animal, a grated floor and an inclined bottom with drain opening, as well as a pipe-based frame, which has the dual purpose of strengthening the cabin and of being used for the piping of the water and other liquids to be sprayed onto the dog. A double wall which is perforated on the inside is used to distribute the drying air. Inside the cabin, there are two columns with circular tracks, which are used to fasten the collar of the animal while it is being washed.

U.S. Pat. No. 3,884,191 describes a machine for the washing and drying of animals, which comprises a cabin provided with means for spraying water and/or cleaning solution onto the animal to be washed, and in which is provided a floor suitable for inclining with the weight of the animal and thus facilitating the displacement of water towards the drain. The drying air is distributed by the same pipes as the water. It also has adjustable means for holding the neck of the animal.

On the other hand, U.S. Pat. No. 4,549,502 pertains to an apparatus for washing animals, such as dogs, cats, and including livestock, which comprises a cabin in which the animal is held, sticking only its head out of same. Inside the cabin, there are a plurality of spray nozzles, as well as a plurality of adjustable brushes, with there being provided means for moving the brushes and for carrying out the brushing of the animal and means for administering hot water and hot drying air through the same spray nozzles.

U.S. Pat. No. 4,505,229 also pertains to an automatic machine for washing dogs and similar animals, which comprises a generally cylindrical housing formed by a flat bottom and by two outer walls, between which are arranged a series of annular and contiguous modular elements; inside, there are a series of nozzles connected to washing means and drying means, and these modular elements have a double wall, which defines an intermediate space divided between a plurality of first and second passages connected, respectively, with the washing and drying means and with the nozzles. On one of the outer walls of the machine, there is an opening, through which the animal sticks its head outwards.

In the majority of the machines mentioned, it is noted that the animal has its head outside the cabin, which means, on the one hand, that the head has to be washed by hand, and on the other hand, that the animal is tied up. In the machine of European Patent Application No. 0673599, the animal remains entirely inside the cabin, but is also tied up and fastened by the collar, which causes it resulting distress. Except for U.S. Pat. No. 4,505,229, the machines of the other patents mentioned do not provide a water saving and recirculation circuit, but the machine of the U.S. patent only has one water tank; therefore, in spite of emptying it after the washing of the animal and refilling it with fresh water for its rinsing, fungi and other microscopic residues, which will be cast on each animal with the fresh water, may remain in the same tank.

SUMMARY AND OBJECTS OF THE INVENTION

Apart from solving all these problems, the present invention deals with an automatic machine for the washing and drying of animals such as dogs and similar animals, which also has other advantages and possibilities which do not exist in the prior-art machines. In fact, the machine of the present invention comprises a cabin with an entrance door for the animal to be washed and a window with an inside light for observing the course of the washing operation and the behavior of the animal. The inside of the cabin is capable of being divided into two or three compartments for washing two or three small dogs at the same time.

The animal is washed by means of exclusive nozzles for this purpose, while the drying with hot air is carried out directly from the opening of a ventilator and the air passes through the inside of the cabin and returns to the air intake of the ventilator through a double ceiling.

The same cabin has two other compartments: one for accommodating a hose connected directly to the water supply to carry out a prewashing of the paws of the animal before it enters the cabin or to vigorously clean the floor of the cabin of any possible excrement; the other compartment accommodates bottles of cleaning, antiseptic, softening, etc. liquid with respective propulsion pumps for the liquids, as well as an electric control panel. The automatic control of the machine is carried out by means of a computer with keyboard and screen. Moreover, the machine itself has a water recirculation system with two separate tanks: one for the recirculated water and the other for fresh water, so that the latter tank never comes into contact with possible fungi and other microscopic residues. Moreover, in the machine of the present invention, the animal or the animals are never tied up by the neck, but are free to move inside the cabin.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF A PREFERRED EMBODIMENT

Figure 5:
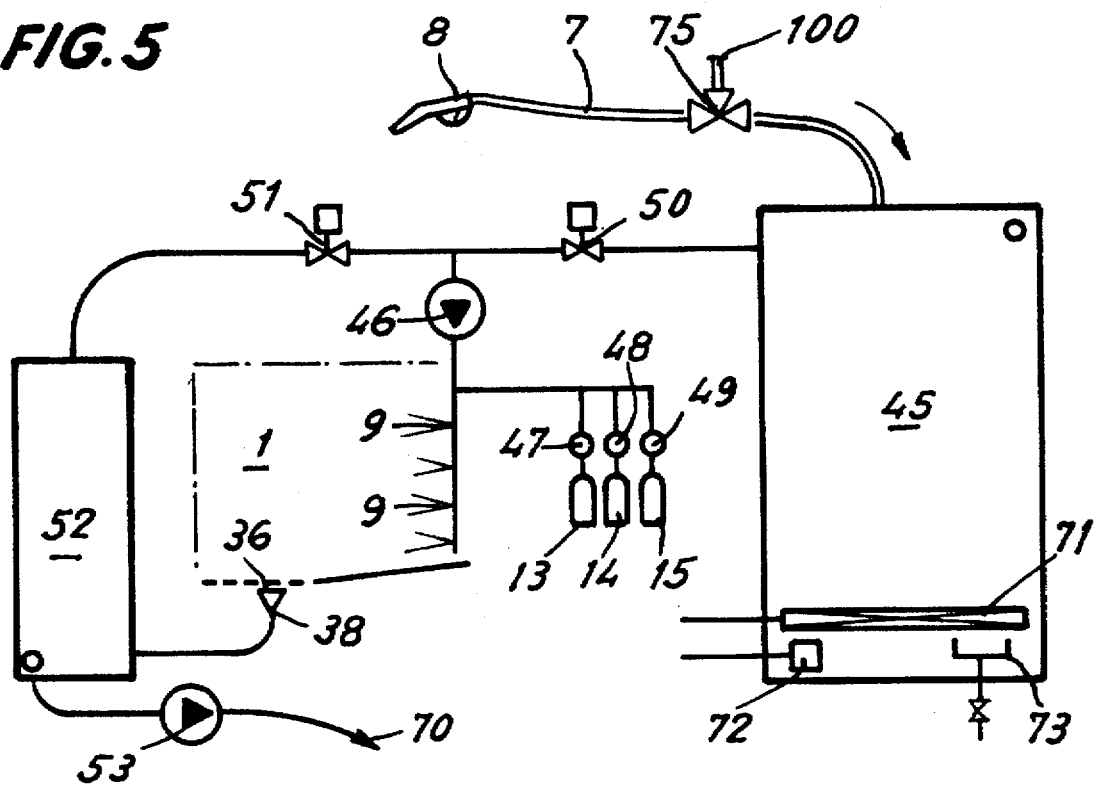
FIG. 5 is a diagram of the hydraulic water recirculation and renewal circuit for the operations of washing and rinsing the animals and of cleaning the machine itself.

According to the drawings, the automatic machine for the washing and the drying of animals, which is the object of the present invention, comprises a general housing 10 provided with wheels 11 for its movement and divided into various compartments: a first compartment or cabin 1; a second compartment 2 that accommodates drying means such as a ventilator 5 provided with air heating elements 6 as well as with various hydraulic circuit elements schematically shown in FIG. 5; a third compartment 3, which accommodates a hose 7, which is rolled up and has a nozzle 8, and which can be turned off or closed by a door 9; and a fourth compartment 4, which is also provided with doors 12, and which accommodates various bottles 13, 14, 15 of predetermined fluids such as the washing, antiseptic, softening, etc. liquids and an electric control panel 16. Above this fourth compartment 4, there is a control means such as a computer 17 with keyboard 18 and screen 19 to control the automatic functioning of the machine.

The cabin 1 is provided with a door 20 for the entrance and the exit of the animal to be washed and with a window 21 and an inside light 22 with a switch 23 for observing the animal while it is washed. The same cabin 1 has a double side wall 24, 25, a double ceiling 26, 27, and a grated floor 28.

Figure 1:
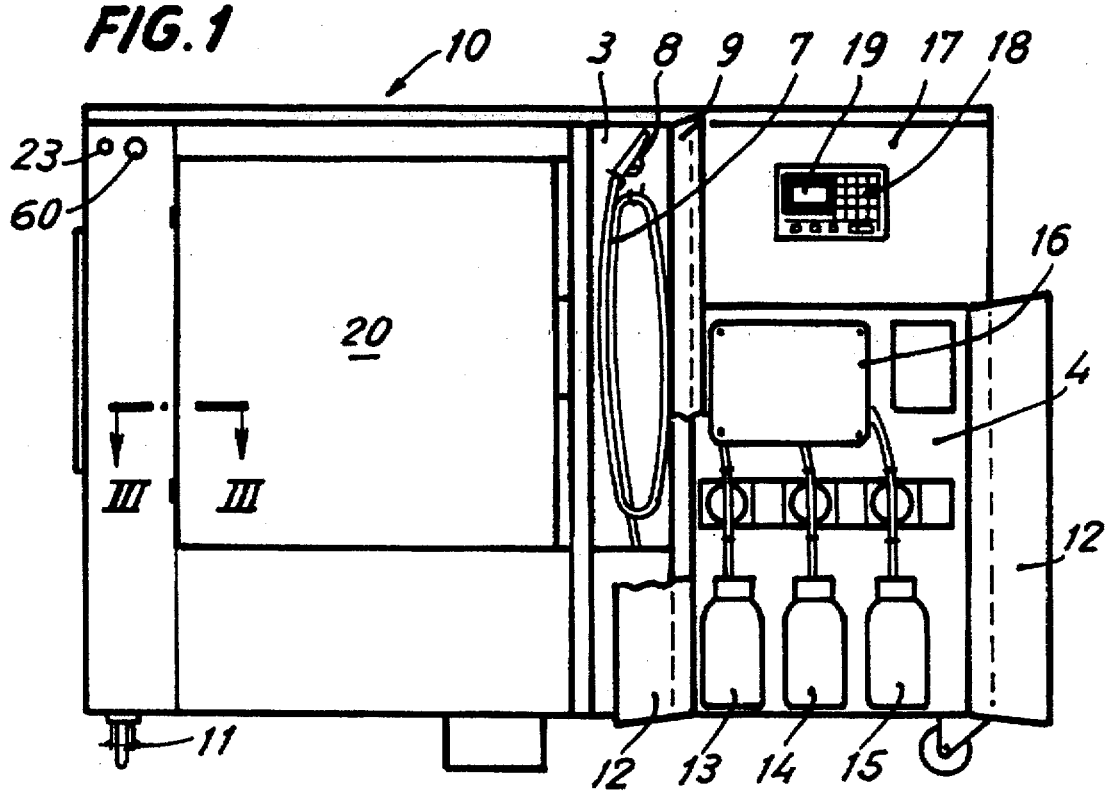
FIG. 1 is an outer front view of the machine according to the present invention with open compartments.
Figure 2:
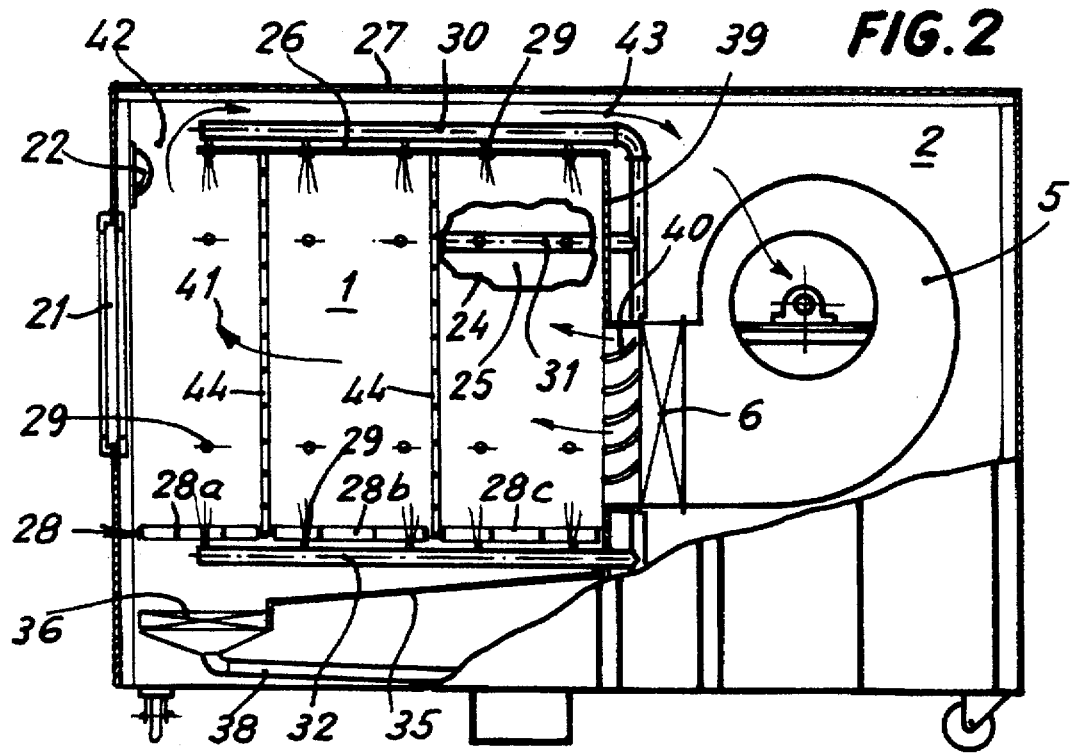
FIG. 2 is a sectional front view of the same machine.
Figure 3:
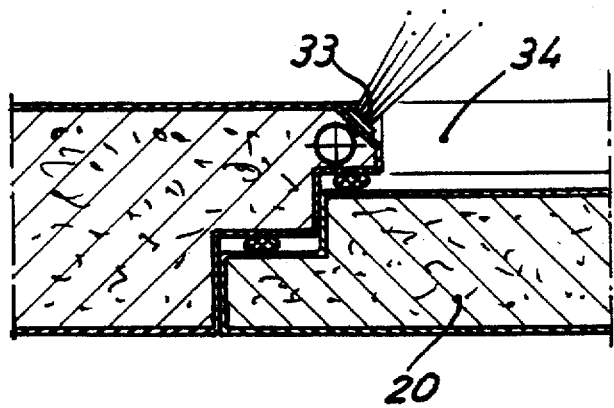
FIG. 3 is an enlarged detail of the section made by the plane III—III of FIG. 1.

The cabin 1 is provided with a plurality of spray nozzles 29 for water and other cleaning, softening, antiseptic, etc. liquids, connected to distribution pipe 30 passing through the double ceiling 26, 27, connected to pipe 31 arranged between the double side wall 24, 25, and connected to pipe 32 arranged under the grated floor 28. Nozzles 33, FIG. 3, are likewise installed in the edges of the opening 34 of the door 20 that point towards the inside of the cabin 1.

An inclined bottom 35, which leads to a filter 36 detachably installed on the opening of the drain 38, appears under the distribution pipe 32. To facilitate the cleaning or changing of the filter 36, the grated floor 28 consists of various detachable sections 28a, 28b, 28c.

On one of the walls 39 of the cabin 1, there is a grated opening 40, which communicates with an outlet of the ventilator 5 with insertion of the heating element 6. In order to provide a recirculation of the hot drying air 41 coming from the ventilator 5, the inner wall 26 of the double ceiling is interrupted, so that the double ceiling communicates, by one passage 42, with the interior of the cabin 1, and with another passage 43, with the compartment 2 of the ventilator 5.

Figure 4:
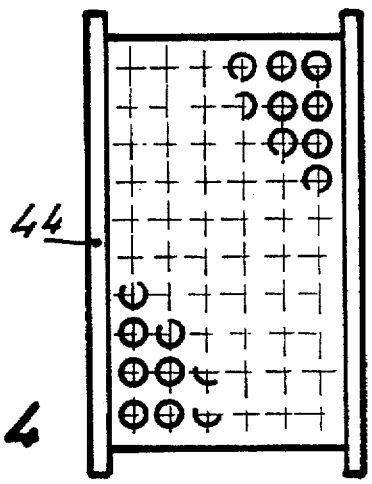
FIG. 4 is a front view of a partition wall dividing the interior of the machine.

There are perforated partitions 44, FIG. 4, which can be detachably anchored in the grated floor 28 and on the inner wall 26 of the double ceiling. These partitions 44 divide the cabin 1 into two or more parts for washing, if desirable, corresponding animals at the same time.

The hydraulic circuit, FIG. 5, mainly consists of: the tank 45, the pump 46, the pulsating pumps 47, 48, 49 connected to the bottles 13, 14, 15, respectively, the valves 50, 51, the tank 52, and the pump 53.

In the operation, the tank 45 is filled with water from the water supply 100, the valve 50 is open and the valve 51 is closed, the pump 46 drives the water towards the sprayers 29 together with the appropriate liquid from any of the bottles 13, 14 or 15 selected by starting the corresponding pump 47, 48 or 49 with pulsating action, then the water, either alone or mixed with any of those liquids, passes through the filter 36 and the drain 38 to the tank 52. Subsequently, the valve 50 closes and the valve 51 opens, with which a recirculation of water between the sprayers 29 and the second tank 52 is initiated. When the washing is completed, the rinsing is started, for which the valve 50 opens again and the valve 51 closes at the exact same time as the pump starts 53. The first pump 46 continues to operate, sending fresh water to the cabin 1 and the water in the tank 52 is emptied into a sewer 70. Once the animal has been dried by means of hot air produced by the ventilator 5 and the heating element 6, and the animal has exited the cabin 1, a washing operation similar to the above is started, i.e., with fresh water and any disinfectant in order to clean the cabin 1 before another animal to be washed enters.

This entire operation is controlled by computer 17 by means of a suitable program, and by the orders given through its keyboard 18.

The first tank 45 is provided with water heating means 71, stabilizing means for stabilizing the temperature of the water 72, connected with the computer 17, and a level gauge 73.

As a complement to the hydraulic circuit described, there is the hose 7 with an outer nozzle 8 connected to the water supply 100 by means of a valve 75 to prewash the paws of the animal before it enters the cabin 1 or to carry out a vigorous washing of the interior of the cabin and to clean it of any dirt, as was stated above.

There is an emergency switch 60 to stop the machine if necessary.

While specific embodiments of the invention have been shown and described in detail to illustrate the application of the principles of the invention, it will be understood that the invention may be embodied otherwise without departing from such principles.

What is claimed is:

1. A washing device for washing and drying of an animal, the device comprising:

a first compartment for accommodating an animal;

a second compartment including drying means for heating and driving drying air through said first compartment, said second compartment including hydraulic circuit means for recirculating and renewing fluid flow through said first compartment, said hydraulic circuit means including a first tank for fresh fluid and a second tank for recirculated fluid;

a third compartment including a hose with a spray nozzle;

a fourth compartment including a container for holding a predetermined fluid selectively in communication with said hydraulic circuit means, said fourth compartment having control means for controlling when said container is connected to said hydraulic circuit means and for controlling operation of said hydraulic circuit means and said dryer means.

2. A device in accordance with claim 1, wherein:

said first compartment has an entrance door for the animal to be washed in a completely untied state and an inspection window, said first compartment includes an interior light, spray nozzles connected to said hydraulic circuit means for treating the animal, said first compartment includes a grated floor on an inclined bottom leading to a filter and to a drain of said hydraulic circuit means;

said fourth compartment includes a plurality of said containers, each container holding a different predetermined fluid;

said control means performs electric control of the washing device.

3. A device in accordance with claim 1, wherein:

said first, second, third and fourth compartments are attached to each other.

4. A washing device in accordance with claim 1, wherein:

said first compartment includes a grated floor and a ceiling, said first compartment includes a plurality of perforated partitions detachably installed between said ceiling and said grated floor for dividing an interior of said first compartment into a plurality of sections for washing a plurality of animals simultaneously.

5. A washing device in accordance with claim 1, wherein:

said first and second compartments have a common side wall defining a grated opening, said dryer means forcing drying air through said grated opening, said dryer means including air heating means for heating said drying air, said first compartment having a double ceiling with a first end communicating with an interior of said first compartment, said double ceiling having a second end communicating with said second compartment for recirculation of said drying air from said first compartment to said second compartment.

6. A washing device in accordance with claim 1, wherein:

said first compartment includes a double ceiling, an entrance door, a double side wall opposite said entrance door and a grated floor over an inclined bottom;

said hydraulic circuit includes a plurality of pipes with a plurality of spray nozzles between said double ceiling, said double side wall, along an edge of said entrance door and between said grated floor and said inclined bottom.

7. A washing device in accordance with claim 1, wherein:

said first compartment includes a grated floor divided into separate parts.

8. A washing device in accordance with claim 1, wherein:

said hydraulic circuit means includes fluid heating means in said first tank for heating fluid in said first tank, stabilizing means for stabilizing a temperature of the fluid in said first tank, and level detector means for detecting a level of the fluid in said first tank, said first tank having an inlet connectable to a water supply and having an outlet connected, through a first valve, to a first pump;

said second tank being in communication with an inlet coming from a drain at a bottom of said first compartment, said second tank including a first outlet connected to said first pump through a second valve, said second tank including a second outlet connected to a general drain through a second pump.

9. A washing device in accordance with claim 8, wherein:

said fourth compartment includes a plurality of said containers, each container holding a different predetermined fluid;

said control means controls operation of said pumps, said first and second valves, means for selecting said plurality of containers, and said air and fluid heating means, said control means including a computer installed in said fourth compartment.

10. A washing device in accordance with claim 1, wherein:

said container is connected to said hydraulic circuit means through a pulsating pump with a pulsating function, said pulsating pump controlling when said container is connected to said hydraulic circuit means.

11. A washing device in accordance with claim 1, wherein;

said hose is connected to a water supply through a hose valve.

* * * * *